Nov. 29, 1955 — L. H. FLORA ET AL — 2,724,883
MOLDING CLIPS
Filed May 6, 1953 — 2 Sheets-Sheet 1
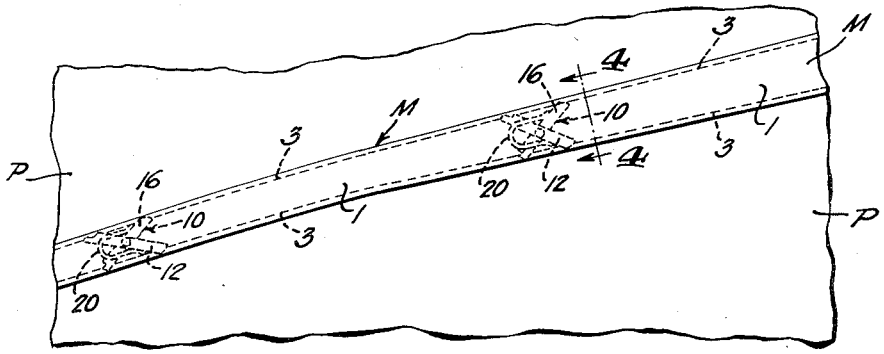
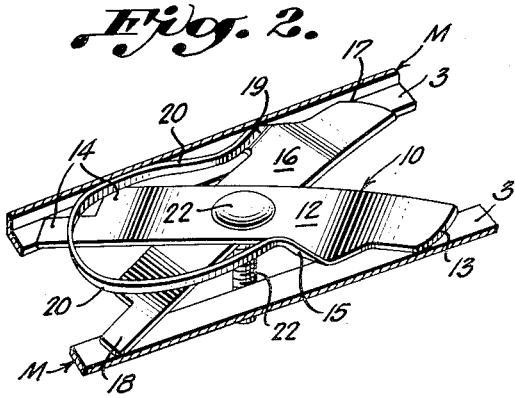
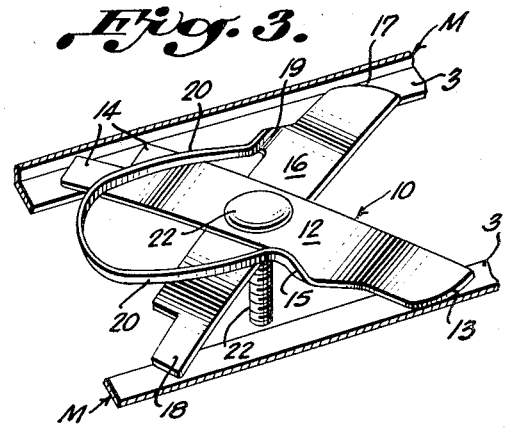
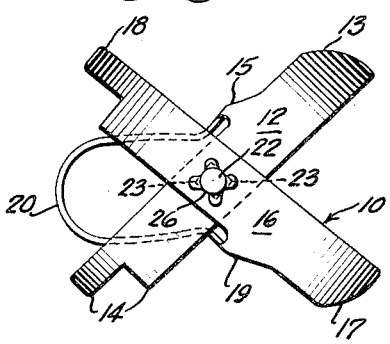
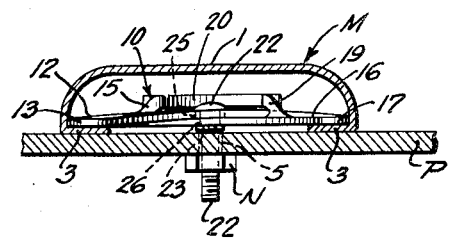
INVENTORS
LAURENCE H. FLORA
JOHN BALINT
BY H. L. Lombard
ATTORNEY

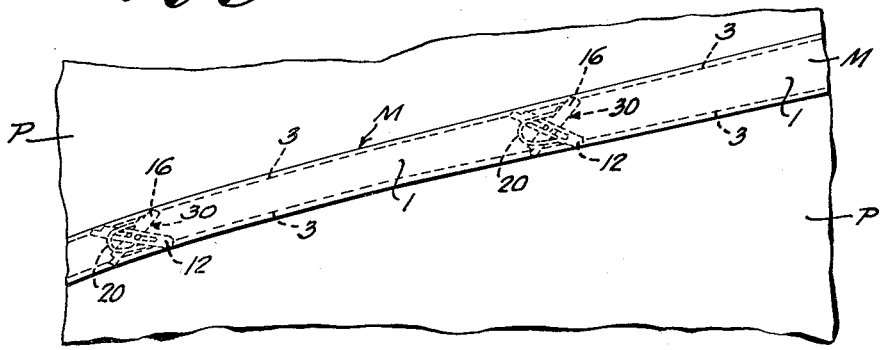
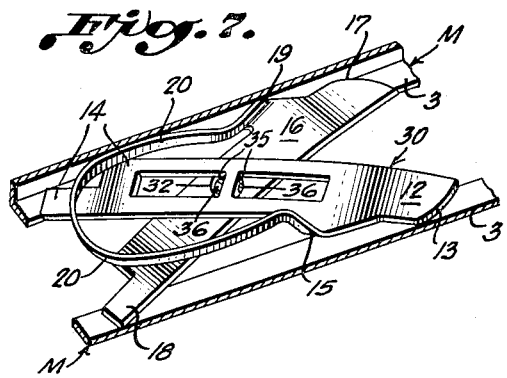
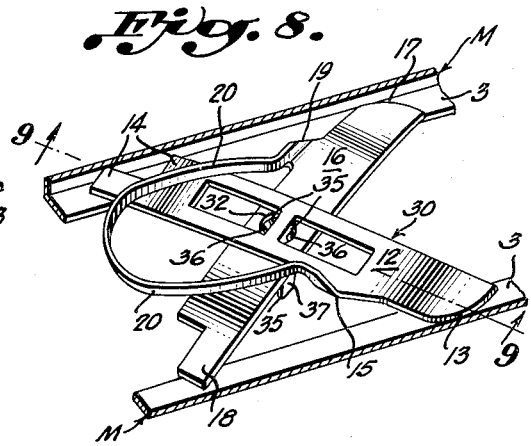
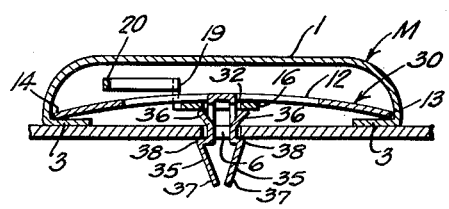
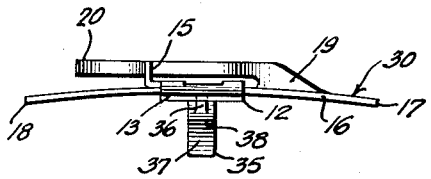
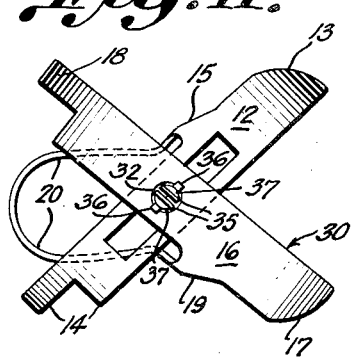
INVENTORS.
LAURENCE H. FLORA
JOHN BALINT
BY H. G. Lombard
ATTORNEY

United States Patent Office 2,724,883
Patented Nov. 29, 1955

2,724,883

MOLDING CLIPS

Laurence H. Flora and John Balint, Cleveland, Ohio, assignors to Tinnermann Products, Inc., Cleveland, Ohio, a corporation of Ohio Application May 6, 1953, Serial No. 353,278

6 Claims. (Cl. 24—73)

This invention relates generally to clips or fasteners for securing moldings, trim strips, and the like, onto a supporting structure and deals, more particularly, with improved constructions for molding clips or fasteners of this character which are adapted for securing a molding of varying width, or for securing various sizes of moldings in different widths.

In many instances, the construction of a molding clip or fastener is such that it is suitable for use only with a molding or trim strip of one width or size, and accordingly, a complete line of clips in different sizes must be provided for moldings of various widths or sizes. In the use of a molding clip or fastener suitable for securing various sizes of moldings in different widths, considerable savings and important advantages are involved inasmuch as only a single set of dies is required for making the clips and there is no problem of stocking and cataloguing various sizes of clips. Moreover, manufacturing variations and inconsistencies frequently develop in the production of the moldings, particularly when made of plastic, such that the inner walls of the moldings are not always precise and uniform throughout their lengths. Consequently, in the use of molding clips or fasteners suitable only for a specific size of molding and which must fit precisely within the inner wall of the molding, there are usually several clips in an installation which are so loosely connected to the molding that the molding is not secured properly with complete effectiveness in the manner intended.

In a further relation, in the moldings provided on present day automobile bodies, cabinet structures, and the like, the moldings are usually designed for a streamlined effect by providing the same in a gradually increasing width from a narrow point at one end to a relatively wide flaring portion at the other end thereof. Accordingly, in these instances, it is highly desirable and advantageous, of course, to secured such a molding by a single size clip or fastener which is adaptable to any width of the molding along the length thereof.

It is, therefore, a primary object of this invention to provide an improved construction for molding clips or fasteners of this character in which the portion of the fastener to be attached to the molding, or the like, is provided by a pair of pivoted head members defining a scissors-like head having relatively yieldable shoulders which extend generally lengthwise in connected relation with the molding and which are yieldable transversely of the molding so as to be readily adjustable for connection to a molding of varying width or to different moldings of various widths, while otherwise adapted for effective, proper connection to moldings of a standard size in a manner to compensate for manufacturing variations and irregularities in the formation of the moldings.

A further object of the invention is to provide an improved construction for molding clips or fasteners having an adjustable head comprising a pair of pivoted head members in a scissors-like formation, as aforesaid, together with a yieldable spring element connected to said pivoted head members and providing the same with an automatic adjustment adapted for connection to a molding of varying width at spaced points along the length thereof, or to different moldings of various widths.

Another object of the invention is to provide an improved construction for molding clips or fasteners of this character in which the pivoted, scissors-like head members of the fastener are integrally connected with the spring element in a simplified structure formed from a single piece of sheet metal.

A further object of the invention is to provide an improved construction for such molding clips or fasteners comprising a pair of scissors-like head members pivotally connected by a stud in the form of a bolt or screw which also serves as the shank of the fastener, and further, with said scissors-like head members having a spring element connected therebetween for providing an automatic adjustment of said scissors-like head members.

Another object of the invention is to provide an improved construction for molding clips or fasteners, such as described, comprising a pair of scissors-like head members pivotally connected by a shank defined by a stud element integrally formed on one head member and secured in an opening in the other head member, and further, with said scissors-like head members having an integral spring element connected therebetween for providing an automatic adjustment of said scissors-like head members.

Further objects and advantages of the invention, and other new and useful features in the construction, arrangement and general combination of elements and details of construction of the improved molding clips or fasteners of the invention will be readily apparent as the following description proceeds with reference to the accompanying drawings, for purposes of illustration but not of limitation, in which like reference characters designate like parts throughout, and in which:

Fig. 1 is a plan or elevational view of a mounting for a molding which varies in width from a narrow point at one end to a relatively wide area at the other end thereof, and illustrates in broken lines the general manner in which molding clips of the same size are adapted to be connected at various points along the length of such a molding of varying width;

Fig. 2 is a perspective view from the top and side of the molding clip employed for securing the narrower portion of the molding seen at the left of Fig. 1, and shows the connection of the scissors-like head members of the clip or fastener with the inturned flanges of the molding, the crown of the molding being omitted;

Fig. 3 is a similar perspective view from the top and side of the molding clip employed for securing the wider portion of the molding seen at the right of Fig. 1;

Fig. 4 is a transverse sectional view along line 4—4 of of Fig. 1, looking in the direction of the arrows; and, Fig. 5 is a bottom plan view of one of the molding clips or fasteners shown employed in Figs. 1–4, inclusive.

Fig. 6 is a plan or elevational view similar to Fig. 1, showing a mounting for a molding which varies in width from a narrow point at one end to a relatively wide area at the other end thereof, and illustrates in broken lines another construction for molding clips or fasteners of the same size which are connected at various points along such a molding of varying width;

Fig. 7 is a perspective view from the top and side of the molding clip employed for securing the narrower portion of the molding seen at the left of Fig. 6, and shows the connection of the scissors-like head members of the clip with the inturned flanges of the molding, the crown of the molding being omitted;

Fig. 8 is a similar perspective view from the top and side of the molding fastener securing the wider portion of the molding seen at the right of Fig. 6;

Fig. 9 is a transverse sectional view, as along line 9—9 of Fig. 8, looking in the direction of the arrows, and shows this form of molding clip as connected to the inturned flanges of the molding and secured in an opening in the supporting part;

Fig. 10 is a side elevational view of the molding clip or fastener shown employed in Figs. 6–9, inclusive; and, Fig. 11 is a bottom plan view of a molding clip or fastener shown in Figs. 6–9, inclusive.

For purposes of illustration, the improved molding clips 10 or fasteners of the invention are shown as used in connection with a molding M of a type employed in automobile body decoration wherein the molding comprises an elongate, hollow rolled length of sheet metal which tapers in width from a relatively narrow end seen at the left of Fig. 1 to a relatively wider area illustrated at the right of Fig. 1. The top or crown 1 of the molding M is suitably decorative and the interior of said molding M is in the nature of a hollow channel-shaped wall having inturned flanges 3 along the longitudinal edges thereof.

In general, molding clips or fasteners in accordance with the invention are provided in an improved construction comprising an adjustable or variable size head defined by a pair of substantially similar head members pivotally connected in a scissors-like formation together with a yieldable spring element positioned between said pivoted head members in an arrangement whereby said head members may be readily compressed or contracted for easy and quick attachment in connection with the inturned flanges 3 of the molding, and said head members thereupon automatically expanded by said spring element for most effective engagement with the area of the molding to which said pivoted head members are attached, even though the molding is of varying width along the length thereof as illustrated in Fig. 1; and thus, a single size of the molding clips or fasteners in accordance with the invention are readily adapted for attachment to such a molding of varying width at practically any area along the length thereof.

The molding clip or fastener 10, Figs. 1–5, inclusive, is provided with a head comprising a pair of substantially similar head members 12, 16, and a spring element 20 integrally connected to the outer sides of said head members 12 and 16, in a manner whereby the entire head member is readily formed from a single stamping of sheet metal. The clips or fasteners may be constructed from any suitable sheet metal, preferably spring steel or cold rolled steel having spring characteristics. The head members 12 and 16 are provided in the form of elongate substantially flat superposed plates, or the like, which are pivotally connected intermediate the ends thereof, preferably at substantially the mid-portions of said head members 12, 16, in an arrangement whereby said head members are adapted for relative pivotal movement in the planes thereof. The upper head member 12 has the outer forward end thereof rounded or curved to define a cam shoulder 13 while the rearward end thereof is suitably recessed to provide a pair of spaced shoulders 14, one or the other or both of which are adapted for effective connection with the associated inturned flange 3 of the molding depending on the cross-sectional contour of the molding area to which the clip is attached. The lower head member 16, likewise, has the outer forward end thereof rounded or curved to provide a cam shoulder 17 while the rearward end thereof forms the shoulder 18.

The head member 12 is provided with an upturned web 15 on its outer forward side which is integrally connected to one end of a strip 20 in the form of a U-shaped spring element extending toward the rear of the head members 12, 16, and having its other end integrally connected to a similar upturned web 19 on the outer forward side of the lower head member 16.

The superposed head members 12, 16, thus provided, are pivotally connected intermediate their ends by a bolt 22 the shank of which extends through aligned passages in said head members 12, 16. The bolt 22 is provided with a square or other flat faced neck adjacent the head thereof which includes corner lugs 23 that extend through and clear the periphery of the enlarged passage 25 in the upper head member 12, Fig. 4, but fit snugly in the smaller passage 26 in the lower head member 16, as shown in Fig. 5, where said corner lugs 23 are peened outwardly or otherwise staked against the marginal portions of said passage 26 in the lower head member 16 to anchor the bolt 22 in a fixed nonrotatable connection with said lower head member 16. The upper head member 12, however, is free to pivot relatively to the bolt 22 by reason of the enlarged bolt passage 25 therein, and accordingly, said upper head member 12 is adapted for a corresponding pivotal movement, in the plane thereof, relatively to the lower head member 16 which is staked to the bolt 22, as aforesaid. Preferably, said head members 12 and 16 are arched or bowed along their lengths so that said head members are resilient and adapted to exert a resilient spring force axially of the shank of the clip in fastening position in a manner whereby the parts of the assembly are secured under constant spring tension.

The integral spring element 20 connected to each of said head members 12, 16, is adapted to yield in accordance with the relative pivotal movement of said head members 12, 16, and when the clip or fastener 10 is normally untensioned, the ends of the pivoted head members 12, 16, are spread apart by said spring element 20 to substantially their maximum spacing. The cam shoulders 13, 17, respectively, on the pair of forward ends of said head members 12, 16, and the shoulders 14, 18, respectively, on the pair of rearward ends thereof are adapted to move toward each other when either of said pair of ends of the head members 12, 16 are moved laterally toward each other in a scissors-like arrangement. Thus, a compression or contraction of the cam shoulders 13, 17 to move the same toward each other will cause relative pivotal movement of said pivotally connected head members 12, 16, to provide a corresponding movement of the shoulders 14, 18 inwardly toward each other. Likewise, movement of the shoulders 14, 18, toward each other, will cause a corresponding movement of the cam shoulders 13, 17, inwardly toward each other. In any such movement of the shoulders 13, 17, and 14, 18, toward each other, the arms of the U-shaped spring element 20 are necessarily biased and thereby tensioned in such biased condition. On removal of the force for contracting or compressing the shoulders 13, 17, and 14, 18, to move the same toward each other, said spring element 20 necessarily attempts to assume its initial normal untensioned condition and thereby urges said shoulders 13, 17, and 14, 18, outwardly toward their maximum spread apart relation, as aforesaid.

The arrangement, accordingly, is such that in attaching the head members 12, 16, of a clip 10 in connected relation with the inturned flanges 3 of the molding M, either the forward or rearward ends of said pivoted head members 12, 16 are compressed toward each other as necessary to permit said shoulders 13, 17 and 14, 18 to pass between the spaced edges of the inturned flanges 3 of the molding. When the force causing said shoulders 13, 17 and 14, 18 to move toward each other is removed, said shoulders automatically spring outwardly under the force of said biased spring element 20 into overlapping connected relation with the inturned flanges 3 of the molding as illustrated in Figs. 2 and 3. The shoulders 13, 17 and 14, 18, do not spread apart to their maximum spacing, but rather, remain slightly compressed toward each other in engagement with the corners of the molding adjacent the inturned flanges 3 under continuously effective spring tension supplied by the arms of the tensioned or biased U-shaped spring element 20.

Important advantages are thereby involved in the provision of the head members 12, 16, in a scissors-like formation whereby the shoulders 13, 17, and 14, 18, are adapted to move readily inwardly and thence outwardly to connect properly and effectively at different points along a molding of varying width, or with moldings of different widths, and otherwise compensate for any manufacturing variations in a supply of moldings in a specific size as provided for mass production methods of assembly. In this regard, the cam surfaces of the shoulders 13, 17, are adapted to slide and cam against the corners of the molding in a manner whereby the shoulders 13, 17, and 14, 18, are automatically seated most effectively in connected relation with the molding M, and with the bolt 22 projecting from the underside of said molding M in substantially normal relation thereto. This automatic seating action of the head members of the clip considerably reduces the time required for applying the molding, inasmuch as said head members do not have to be precisely positioned or aligned prior to attachment in connected relation with the molding.

In completing an installation of a molding M substantially shown in Figs. 1 and 4, it will be understood that as many of the molding clips or fasteners 10 as are necessary or desirable are easily and quickly connected to the molding M, with full effectiveness, at spaced points along the length thereof, even though the molding is of varying width inasmuch as the scissors-like head members 12, 16, of each molding clip 10 are adapted for ready contraction and automatic expansion for this purpose, as aforesaid. Each of the molding clips 10 is easily and quickly attached to the molding M simply by positioning the head members 12, 16, of the clip lengthwise of the molding M with the shoulders 13, 17, and 14, 18, on said head members in position to slip under the adjacent inturned flanges 3 of the molding M and with the shank of the bolt 22 projecting from the underside of said molding M. The scissors-like head members 12, 16, are thereupon subjected to a pivotal movement so as to be contracted transversely of the molding M as necessary to permit the shoulders 13, 17, and 14, 18, on the ends of said head members 12, 16, to pass between the edges of the inturned flanges 3 of the molding, whereupon the spring element 20 provides a reverse pivotal movement of said head members 12, 16 to automatically expand said shoulders 13, 17, and 14, 18, into overlapping connected relation with said inturned flanges 3 of the molding and in tensioned engagement with the corners of the molding adjacent said flanges 3. This connected relation of the molding clips 10 with the molding M is substantially identical whether at a narrow region of the molding M as seen in Fig. 2, or at a wider area thereof as seen in Fig. 3, inasmuch as the scissors-like head members 12, 16 of the clips are sufficiently adjustable to adapt the same for effective connection to the molding M at any point along the length thereof even though the molding is of varying width, as aforesaid.

The molding M is then ready to be applied to the supporting part P which is prepared with a suitable number of shank receiving openings 5, Fig. 4, along the path which said molding M extends in mounted position thereon and with such stud receiving openings having a predetermined spacing corresponding to and spacing of the shanks of the bolts 22 on the clips in connected relation with the molding M. The shank of the bolt 22 in each clip 10 is inserted into its respective opening 5 in the supporting panel P with said shank projecting from the underside thereof where it is secured in the usual manner by a nut N, Fig. 4, to complete the installation of the molding M, substantially as shown in Figs. 1 and 4.

Figs. 6-11, inculsive, show another form of molding clip or fastener 30, in accordance with the invention, which is generally similar in application and use to that described with reference to Figs. 1-5, inclusive. This embodiment of the invention is advantageous in that it is provided in an all sheet metal construction formed from a single piece of sheet metal to include an integral shank adapted to be secured in an opening in the supporting part in the manner of a snap stud without need for a bolt or nut or other extraneous securing means.

The clip 30 is provided with a generally similar head comprising a pair of pivoted head members 12, 16, having cam shoulders 13, 17, respectively, on their forward ends and shoulders 14, 18, respectively, on their rearward ends, and the same type of integral spring 20 connected to web portions 15, 19, respectively, on the outer forward sides of said head members 12, 16. In general, the upper head member 12 is provided with one or more stud elements which extend through a passage in the lower head member 16 to provide the pivoted connection of said head members 12, 16, while otherwise defining a shank which serves to secure the clip in the opening 6 in the supporting part as shown in Fig. 9. In a preferred construction, the lower head member 16 is provided with a simple circular passage 32, and the upper head element 12 is stamped with a pair of strip-like leg or shank elements 35 on opposite sides of an integral portion in the center of said head member 12, and said leg members 35 bent in the same general direction to the underside of said head member 12 to define a stud which extends through said passage 32 in the lower head member 16.

The leg members 35 are formed with resilient tabs 36, or the like, provided by partially severed portions which are bent outwardly out of the planes of said leg members 35 so that the free ends of said tabs 36 are adapted to snap through the passage 32 in the lower head member 16 and engage marginal portions at the underside of said passage 32 to retain said leg members 35 in assembled relation in said passage 32 and thereby pivotally connect said head members 12, 16, for operation in the same general manner as in the previously described form of the invention. The shank elements 35 may be formed to provide a snap fastening stud, or the like, of any suitable character, and, in the present example, the free ends of said shank elements 35 are bent to define outwardly diverging guide surfaces 37 merging into inwardly bent portions defining outwardly projecting abutments 38 adapted for snap fastening engagement with marginal portions of the panel opening 6 in part P, as shown in Fig. 9.

The molding clips or fasteners 30, thus provided, are assembled with the molding M by attaching the scissors-like head members 12, 16, in connected relation with the inturned flanges 3 of the molding in the same procedure described with reference to the form of the invention shown in Figs. 1-5, inclusive, with the shank of each clip 30 defined by the leg elements 35 projecting from the underside of the said molding M. In mounting the molding M, the projecting shank of each clip 30 is readily entered into its associated opening 6 in the panel P or other support inasmuch as said legs 35 preferably taper to a point which is much smaller than the size of the panel opening 6.

Axial pressure is then applied to the crown 1 of the molding M to move the shank legs 35 axially into the panel opening 6, whereupon the outwardly diverging guide surfaces 37 cam against the marginal edges of said panel opening 6 to cause a gradual contraction of said legs 35 as necessary for the same to pass through said opening 6 to a position in which the abutments 38 spring outwardly into engagement with marginal portions of said panel opening 6, Fig. 9, to secure said fastener 30 in applied position mounting the molding M on the supporting part P, as seen in Fig. 6.

The head members 12, 16, of the molding clip of Figs. 1-5, inclusive, and the complete molding clip of Figs. 6-11, inclusive, are constructed of relatively thin sheet metal, the thickness of which is selected according to service requirements and the predetermined size of the molding or similar part to be secured. The clips or fasteners are most effective when provided of spring metal suitably tempered and otherwise treated to give the desired toughness and hardness. A cheap and highly satisfactory clip or fastener may be constructed from cold rolled metal, such as cold rolled steel, which is untempered but of a spring metal nature and capable of providing an effective and reliable clip or fastener for a molding installation, or the like, in accordance with the invention.

While the invention has been described in detail with specific examples, such examples are intended as illustrations only, inasmuch as it is quite apparent that modifications in the construction, arrangement and general combination of parts and elements of the clips or fasteners of the invention may be provided without departing from the spirit and scope of the invention.

What is claimed is:

1. A fastener comprising a pair of sheet metal head members movable relatively to each other in the planes thereof and having overlapping portions and at least two free end portions, pivot means pivotally connecting said overlapping portions of said head members so that said free end portions are adapted for lateral movement relatively to each other, a normally expanded spring connected to said free end portions of said head members and urging said free end portions outwardly from each other, said pivot means comprising at least one integral stud element on one head member extending through a passage in the other head member.

2. A fastener having a head comprising a pair of sheet metal head members movable relatively to each other in the planes thereof and arranged in crossed relation to provide overlapping portions and a pair of free end portions at each end of said head, pivot means pivotally connecting said overlapping portions of said head members so that each pair of said free end portions is adapted for lateral movement relatively to each other, a normally expanded spring connected to one pair of said free end portions and urging said free end portions outwardly from each other, said pivot means comprising at least one integral stud element on one head member extending through a passage in the other head member.

3. A fastener comprising a pair of sheet metal head members movable relatively to each other in the planes thereof and having overlapping portions and at least two free end portions, pivot means pivotally connecting said overlapping portions of said head members so that said free end portions are adapted for lateral movement relatively to each other, said pivot means comprising an area of the overlapping portion of one head member having a passage and a pair of integral stud elements carried by the overlapping portion of the other head member and extending through said passage, and a normally expanded spring connected to said free end portions of said head members and urging said free end portions outwardly from each other.

4. A fastener having a head comprising a pair of sheet metal head members movable relatively to each other in the planes thereof and arranged in crossed relation to provide overlapping portions and a pair of free end portions at each end of said head, pivot means pivotally connecting said overlapping portions of said head members so that each pair of said free end portions is adapted for lateral movement relatively to each other, said pivot means comprising an area of the overlapping portion of one head member having a passage and a pair of integral stud elements carried by the overlapping portion of the other head member extending through said passage, means on said stud elements engaging the marginal portion of said passage to secure said stud elements therein, and a normally expanded spring connected to one pair of said free end portions of said head members and urging said free end portions outwardly from each other.

5. A fastener having a head comprising a pair of sheet metal head members movable relatively to each other in the planes thereof and arranged in crossed relation to provide overlapping portions and a pair of free end portions at each end of said head, pivot means pivotally connecting said overlapping portions of said head members so that each pair of said free end portions is adapted for lateral movement relatively to each other, said pivot means comprising an area of the overlapping portion of one head member having a passage and a pair of integral stud elements carried by the overlapping portion of the other head member extending through said passage, outwardly projecting tabs on said stud elements engaging the marginal portion of said passage to secure said stud elements therein, and a normally expanded spring comprising a strip of sheet metal having its ends integral with one pair of said free end portions of said sheet metal head members and urging said free end portions outwardly from each other.

6. A fastening device for hollow moldings having inturned opposed mounting flanges, said device being inherently adjustable to accommodate a wide range of molding widths, including a bolt having ahead at one end, a threaded shank at the other end and a noncircular clamping member supporting portion between said head and shank portions, said head and noncircular portions supporting molding clamping means and said portions and clamping means being constructed and arranged to be wholly contained within the interior of the molding; said clamping means comprising a pair of molding engaging clamping members mounted on said noncircular portion, each of said members including oppositely extending arms and one of said members having nonrotatable engagement with said bolt and the other of said members being rotatably mounted thereon, and means securing said members on said portion against movement axially of said bolt while exerting sufficient pressure against said members to permit the rotatable member to be moved thereon with difficulty, the ends of said members terminating in a plane normal to the axis of said bolt and disposed at the side of said members remote from said head, said noncircular portion at the end thereof adjacent said shank being distorted laterally with resultant formation of spur elements overlying said clamping members and securing them against said head with sufficient pressure to permit rotative movement of said other member thereon with difficulty incident to moving said members to such relative position as to engage each molding flange at two points closely adjacent the molding sidewall associated with that flange.

References Cited in the file of this patent

UNITED STATES PATENTS

| 987,095 | Bonta | Mar. 14, 1911 |
| 1,306,073 | Mertens | June 10, 1919 |
| 1,396,279 | Paine | Nov. 8, 1921 |
| 1,602,451 | Reardon | Oct. 12, 1926 |
| 2,515,895 | Poupitch | July 18, 1950 |
| 2,531,348 | Amesbury | Nov. 21, 1950 |
| 2,618,824 | Poupitch | Nov. 25, 1952 |

FOREIGN PATENTS

| 44,272 | Denmark | June 29, 1931 |
| 207,390 | Switzerland | Feb. 16, 1940 |